Oct. 16, 1934.   S. BERGSTEIN   1,976,980
METHOD OF MANUFACTURING HERMETICALLY SEALED PACKAGES
Filed April 7, 1933
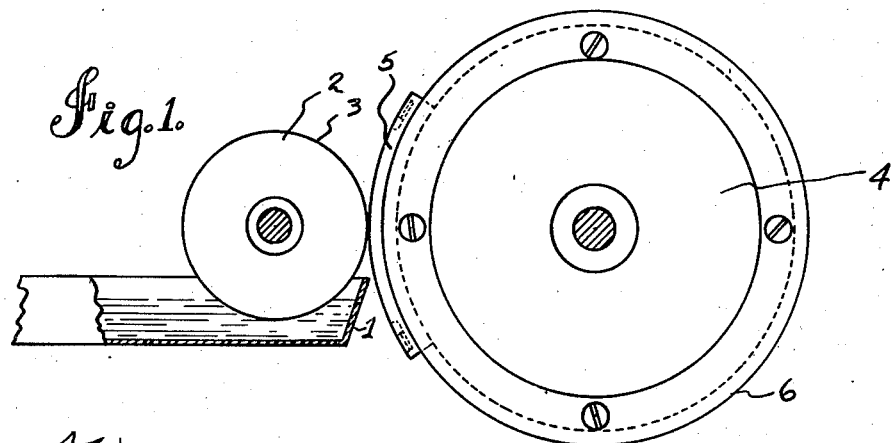
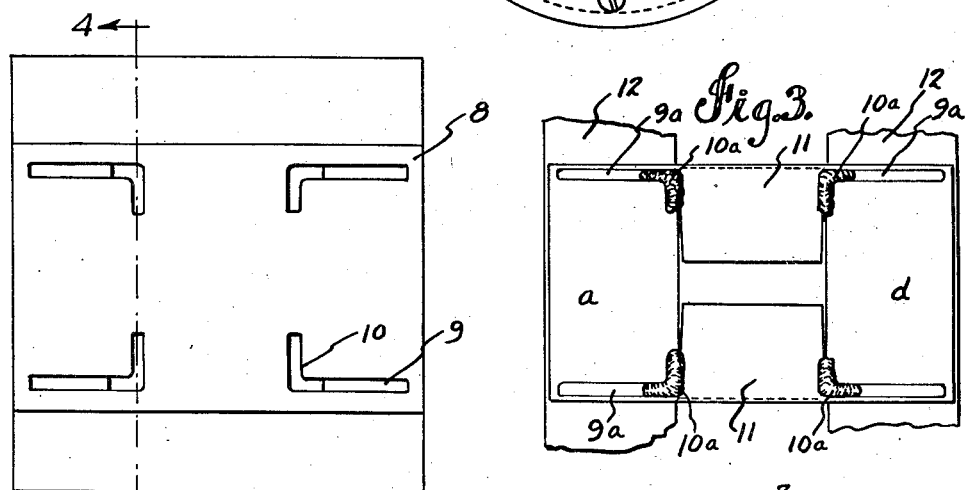
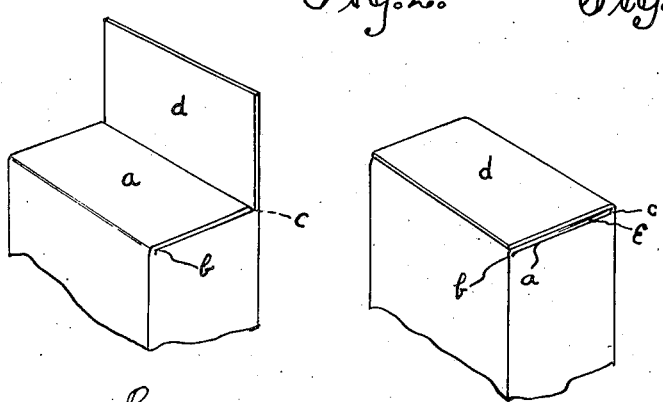
INVENTOR.
Samuel Bergstein
BY
ATTORNEYS.

Patented Oct. 16, 1934

1,976,980

UNITED STATES PATENT OFFICE 1,976,980

METHOD OF MANUFACTURING HERMETICALLY SEALED PACKAGES

Samuel Bergstein, Cincinnati, Ohio

Application April 7, 1933, Serial No. 664,949

7 Claims. (Cl. 93—6)

My invention relates to a novel method of making sift-proof cartons and containers, and in which, if the material of which the packages are made is impenetrable to oil, water and air leakage, the method will result in a substantially hermetic seal for the package.

In my application, Ser. No. 646,665, filed December 10, 1932 I have described a novel laminated board and packages made therefrom in which an elastic adhesive is employed which prevents the corners and edges of the sealing flaps from breaking the structure of the board after the adhesive is dried and the corners are bent or folded. While closely allied to the aforenoted invention, I have made further improvements.

In my application 628,566, filed August 12, 1932 I have described a method of sealing the closure flaps of cartons by applying thick strips of adhesive along the lines of articulation of the closure flaps and carton walls so that when the flaps are folded in and closed, a bead of adhesive is formed at the corner edges of the end surface of the closure flaps. Reference is made to the aforenoted application, and in the present invention one of the modifications relates to an improved manner of applying beads of adhesive to sealing flaps.

In my application, Ser. No. 632,733, I have further disclosed a method of sealing edges of carton sealing flaps in which the cartons are greaseproof, in which grease-proof adhesive is disposed in the sealed portions of the blank to form a barrier to prevent the seepage of oily material between the laminations of the board. Reference is made to the aforenoted application, and to the method described therein which may be employed in conjunction with one of the modifications of the invention disclosed herein.

It is the object of my invention in its specific application, as described herein, to apply, preferably by means of timed glue applying mechanism, a light film of adhesive to certain areas of carton sealing flaps, and at the same time to apply thicker beads or stripes to fill in the crevices and pin holes which are formed at the edges of the flaps when they are sealed down in position.

The adhesive which I apply fills in the cervices and not only makes a tighter bond between the closing flaps, but makes the carton less likely to have the corner edges indented with handling. When the corner edges of cartons are bent in leakage often develops, and if the carton is to be tight wrapped, holes are often pierced through the outer wrapper at the corner through which leakage and seepage may develop.

While I do not limit myself to the use of any particular type of adhesive, I prefer to use a rubber latex adhesive because such an adhesive remains resilient and does not cause the flaps to crack at their articulated joints.

The accomplishment of my objects will be better understood by reference to the accompanying drawing which forms part of this application, and to the positions indicated in the views of the cartons during different stages of sealing, in which the positions where leakage is most likely to occur are noted.

Referring to the drawing, I have shown in Fig. 1 a perspective view of a glue wheel showing a preferred manner of applying a thin surface coating of adhesive and at the same time to apply thicker beads or stripes to certain portions so that the crevices, cracks and pin holes may be filled up.

Fig. 2 is a plan view of an adhesive applying pad which is adjustably mounted in the glue wheel so that it can be set at a desired spacing relative to carton flaps, so that the reinforcing stripes of adhesive will be positioned properly with reference to the crevices which I propose to fill up.

Fig. 3 is a plan view of a carton during the preliminary stages of folding over and sealing the end closure flaps and showing the application of the thicker stripes of adhesive to the parts of the flaps where crevices are ordinarily formed.

Fig. 4 is a perspective view of the glue pads shown in Figs. 1 and 2, as indicated along the section line 4—4 in Figure 2.

Fig. 5 is a perspective view of a carton with three of the closures folded down.

Fig. 6 is a perspective view of a carton with the final side closing flap folded down.

In order to describe my invention, I will first refer to the perspective views in Figs. 5 and 6. Referring to Fig. 5, it will be understood that the end closure flaps are folded in and one of the side closure flaps which I have indicated at $a$, folded in and secured to the end closure flaps. The position where leakage is most likely to develop is at the corner edges indicated at $b$, $c$. In Figure 6, when the last side flap is folded down, there is not only a tendency to develop leakage at the corner $c$, but there is some tendency to develop leakage between the flaps $a$ and the last flap to be folded down, which is indicated at $d$. In Figure 6 I have indicated at $e$ where this leakage is likely to develop.

Referring now to the method employed in applying the reinforcing and "crevice filling-in"

beads of adhesive, I have indicated at 1 a glue pan. At 2 I have shown a roller so set that it extends below the surface of the glue and carries up with it a coating 3 of adhesive. I have indicated at 4 a glue wheel on which there is shown a glue pad 5. The mounting of the glue pad on the glue wheel is much the same as the usual mounting for a printing plate on a printing roller. Rings 6 engage dove-tailed, recessed portions 7 of the glue pad at each side of the roller, and so provide a mounting in which the glue pad may be secured at a desired position on the glue roller.

The glue pad 5 is a flat, rounded surface portion 8 which comes in contact with the coating carried up by the roller 2 and spreads an even coating of adhesive over its surface.

In the glue pad indicated in the figures I have shown indentations 9 extending along the sides of the glue pad, which apply a slightly thicker band of adhesive to the predetermined portions of the carton sealing flaps. I have further indicated at 10 recesses which are slightly deeper in the glue pad, and which carry a still thicker coating of the adhesive. When the glue pad comes in contact with the roller 2 the surface 8 picks up a thin coating. The indentations 9 are also filled up so they transmit to the carton a thicker stripe of adhesive. At the same time the recessed portions 10 pick up a still thicker coating.

As the cartons are moved along the end flaps 11 are first folded in. The side flaps a, d, are then folded outwardly and supported by means of guide plates indicated at 12 in Fig. 3. The movement of the carton and the timing of the glue wheel is such that the pad is then brought in contact with the supported side flaps and adhesive is applied throughout the entire area of both of the side flaps. This will, of course, be the thin coating. At the same time thicker beads or stripes of adhesive are applied along the sides of the side flaps as indicated at 9a. The positions where the greatest leakage occurs, and as is indicated in Figs. 5 and 6 at b and c, are then filled in with a thicker band of adhesive as indicated at 10a in Fig. 3.

When the side closure flaps are folded over, all the crevices between the closure flaps are filled up so that there is no tendency for even air leakage to develop. In actual tests for air leakage development cartons sealed in accordance with my invention have withstood pressure tests hundreds of times longer than cartons which are not sealed so that the crevices are filled in. By means of the timed mechanism I am able to control the particular positions on the carton to which the adhesive is applied, and I therefore can so position the adhesive that it does not tend to squeeze out in beads at the corners and so have an unsightly appearance.

Having thus described my invention, what I claim as new and desire to secure by Letters Patent, is:—

1. A method of hermetically sealing containers having closure flaps which consists in applying with timed mechanism a thin coating of adhesive to seal the flaps together and at the same time applying heavier coatings in such quantity and in such location that, when the flaps are sealed, said coatings will fill in the crevices between the closure flaps.

2. A method of hermetically sealing containers having closure flaps which consists in applying with timed mechanism a thin coating of adhesive to seal the flaps together and at the same time applying heavier coatings in such quantity and in such location that, when the flaps are sealed, said coatings will fill in the crevices between the closure flaps, particularly at the corners thereof.

3. A method of hermetically sealing containers having overlapping closure flaps which consists in applying with timed mechanism adhesive to the closure flaps in a thin coating with an excess in such proximity to the exposed edges of the overlapping closure flaps and in such quantity as to fill in the crevices formed between the flaps.

4. A method of hermetically sealing containers, which consists in applying adhesive to overlapping surfaces of closure flaps of said containers and coincidently applying thick beads of adhesive in such positions and in such quantities on the flaps as will, when the flaps are closed, fill in the crevices formed along the lateral edges of and at the corners of the exposed edges of the flaps, said application of the thick beads being so controlled as not to exude out in beads at said corners.

5. A method of hermetically sealing containers, which consists in applying adhesive to overlapping surfaces of closure flaps of said containers and coincidentally applying thick beads of adhesive in such positions and in such quantities on the flaps as will, when the flaps are closed, fill in the crevices formed along the lateral edges of and at the corners of the exposed edges of the flaps.

6. A method of hermetically sealing containers by machine operation, which consists in applying adhesive to major portions of the areas of the container flaps in such limited thickness as will, by setting of the relatively thin coating on said major portions, result in quick securing of the flaps in sealed relation to each other in accordance with the rate of machine operation, and also applying thicker portions of adhesive to minor portions of the container flaps in locations adjacent edges and corners of the container which will be imperfectly sealed by the thinner adhesive, to complete the sealing of the container at said locations when the flaps are closed and secured by the thinner coatings of adhesive.

7. A method as set forth in claim 6, in which the thicker portions of adhesive are of L shape, thicker than the thin securing coating along edges of the flaps, and still thicker adjacent the angle of the L shape, which is at the corners where the flaps join the walls of the container.

SAMUEL BERGSTEIN.